Dec. 20, 1938.    N. D. LEVIN    2,140,636
PORTABLE LOADING MACHINE
Original Filed Sept. 16, 1931    2 Sheets-Sheet 2

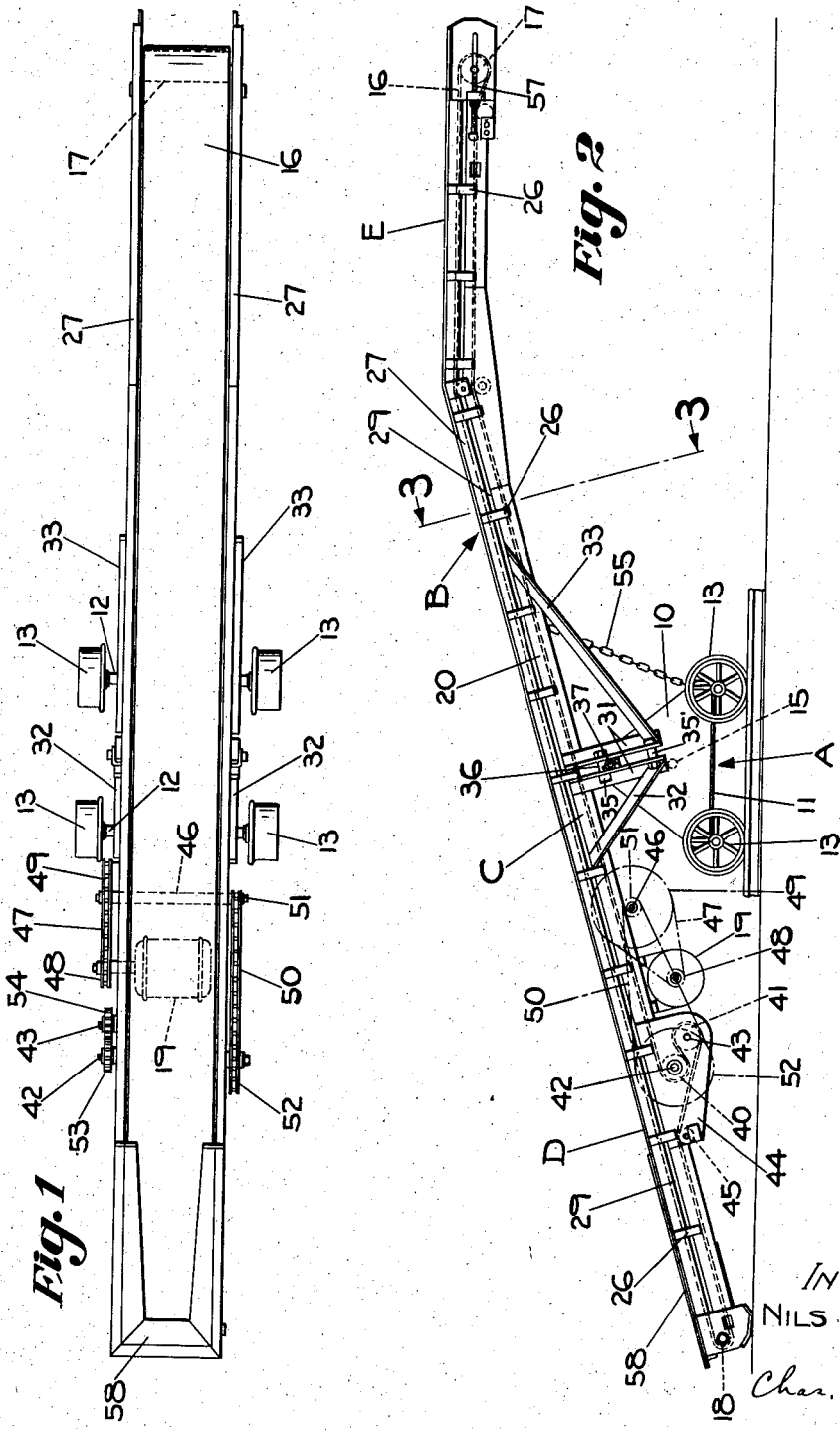

INVENTOR:
NILS D. LEVIN,
BY
Chas. M. Nissen,
ATT'Y.

Patented Dec. 20, 1938

2,140,636

UNITED STATES PATENT OFFICE 2,140,636

PORTABLE LOADING MACHINE

Nils D. Levin, Columbus, Ohio, assignor to The Jeffrey Manufacturing Company, Columbus, Ohio, a corporation of Ohio Original application September 16, 1931, Serial No. 563,113. Divided and this application March 21, 1936, Serial No. 70,036

1 Claim. (Cl. 198—233)

My invention relates to portable loaders and one of its objects is to provide an improved and simplified supporting structure therefor.

A further object of the invention is to provide improved mechanism for holding the conveyor at an adjusted inclination.

Other objects of the invention will appear hereinafter, the novel features and combinations being set forth in the claims hereto appended.

In the accompanying drawings,

Fig. 1 is a plan view of a portable loader embodying my improvements.

Fig. 2 is an elevation of the same.

The portable loader illustrated in Figs. 1 and 2 comprises a truck A and a conveyor B pivotally mounted on the truck A for swinging movement in vertical planes.

Figure 4:
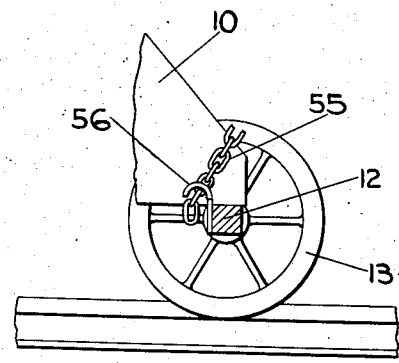
Fig. 4 is a detail view.

Truck A comprises two vertical spaced apart plates 10, 10 having at their lower ends outwardly extending horizontal flanges 11, 11 which are welded to the axles 12 which are square in cross-section as shown in Fig. 4. The axles 12 are provided with cylindrical ends on which are mounted for free rotation the truck wheels 13.

Stiffening or reinforcing plates 14 of triangular shape are welded along their horizontal and vertical edges to the squared axles 12 and the outer sides of the plates 10. These plates 14 brace the vertical plates 10 and add to the strength of the truck frame.

A tubular cross member 15 extends between the two plates 10 and is welded at its ends to said plates thus adding further to the rigidity of the truck frame. Notwithstanding the simplicity of construction of the truck frame, it is of sufficient strength to afford ample support to the conveyor and withstand rough usage to which portable conveyors are subjected in practical operation.

The conveyor B comprises a longitudinally extending frame C having an inclined forward portion D and a horizontal rear portion E.

An endless belt 16 extends along the entire length of the frame C. A head pulley 17 is supported at the rear end of the conveyor frame and a foot pulley 18 is supported at the forward end thereof. An electric motor 19 is positioned below the forward portion D of the conveyor and is connected to the conveyor belt 16 to drive the same as hereinafter more fully explained.

Figure 3:
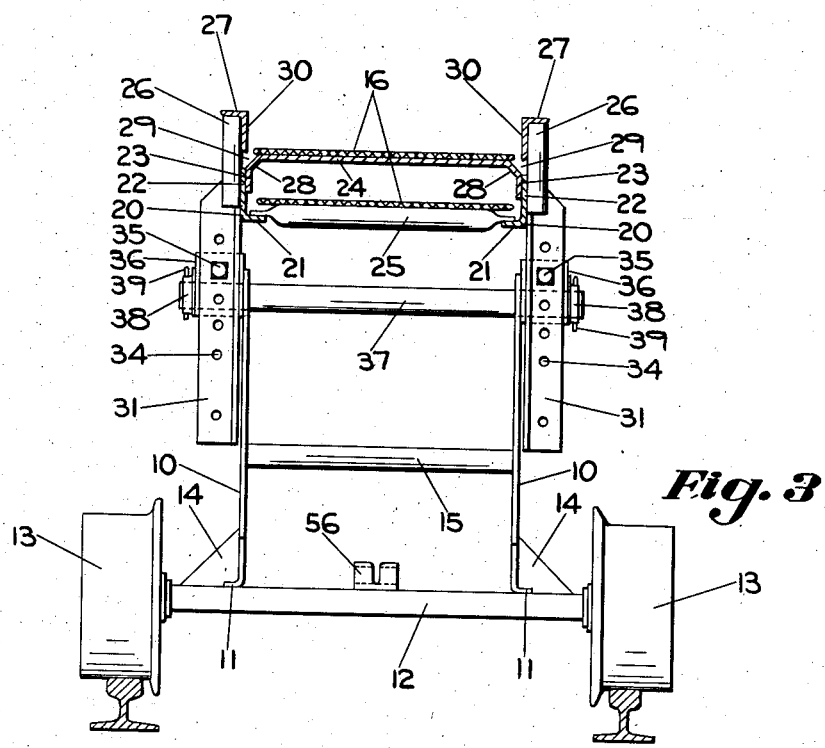
Fig. 3 is a sectional elevation taken on the line 3—3 of Fig. 2, looking in the direction of the arrows.

The conveyor frame comprises longitudinally extending angle irons 20, 20, spaced apart and located on opposite sides of the conveyor frame as shown in Fig. 3. Welded to the vertical flanges 22 of the angle irons 20 are downwardly extending flanges 23 of a belt supporting trough or bed plate 24. Transversely extending tubular cross members 25 are flattened at their ends and welded to the upper sides of the lower horizontal flanges 21 of the angle irons 20 to brace the conveyor frame and serve to support the lower run or strand of the belt 16. The cross members 25 being of tubular shape offer but little resistance to the propulsion of the belt and because of the smooth upper surfaces of the cross members 25 no undue wear of the belt will occur. Furthermore, sagging of the lower run or strand of the belt is prevented by the cross pieces 25 which are spaced apart or located at intervals between the ends of the conveyor.

Welded to the vertical flanges 22 of the angle irons 20 and extending upwardly therefrom is a plurality of tubular rods or tubes 26 which are spaced apart or located at intervals along the entire length of the conveyor frame as shown in Fig. 2. To the upper ends of the tubes 26 are welded the vertical flanges 30, 30 of the longitudinally extending angle irons 27, 27 which afford lateral guide plates for the edges of the upper run or strand of the belt 16.

It should be noted that the trough or bed plate 24 is beveled at 28, 28 to afford longitudinal spaces 29, 29 between the lower edges of the guide plates 30, 30 of the upper angles 27 and the upper edges of the flanges 22 of the angle irons 20.

When belts travel in troughs between guides there is a tendency for the material to spill off the edges of the belt and creep under the same, causing such abrasion as to effect excessive wear of the belt and the trough plates.

Since the tubes 26, 26 are secured to the vertical flanges 22 and 30 so as to hold them spaced apart, a longitudinal slot is produced along each side of the conveyor trough. It will therefore be seen that material which spills off the edges of the belt 16 has free egress into the longitudinal spaces 29 and laterally from these spaces through the slots which extend longitudinally of the conveyor frame as shown in Fig. 2. Therefore, longitudinally extending lateral spillways are provided so that material spilling off the edges of the belt instead of creeping under the same will be ejected laterally along the beveled portions 28, 28 out through the longitudinal slots or lateral unobstructed passageways, thereby greatly reducing friction and wear.

It should also be noted that the vertical members 26 are circular in cross section and they do not obstruct the free passage of spilled material from the longitudinal troughs 29.

Two pairs of angle irons 31 are welded to the vertical flanges 22, 22 of the angle irons 20 at the sides of the conveyor frame C. The angle irons 31 extend downwardly from the frame C and are braced longitudinally of the conveyor frame by means of the angle irons 32 and 33.

The transverse flanges of the angle irons 31 are provided with a vertical series of spaced apertures 34 through which are adapted to be passed pins which may be in the form of bolts 35, 35 which support the slide blocks 36, 36.

Journaled in aligned openings in the blocks 36 is a cross shaft 37 which is supported by the vertical truck plates 10 by extending through openings therein. It is preferred that said cross shaft 37 be rigidly attached to plates 10 to provide an additional brace, the attachment being by welding, the slide blocks 36, 36 being journaled on the ends of said shaft 37. If desired, blocks 36, 36 may be clamped rigidly to shaft 37 and said shaft loosely journaled in plates 10. The outer ends of the shaft 37 are provided with washers 38 and cotter pins or keys 39 to prevent disengagement of the adjacent parts.

The bolts 35 extend through apertures in slide blocks 36 and therefore when the conveyor frame is adjusted in elevation it is supported on the slide blocks 36 and the shaft 37 against movement either up or down, but the conveyor is free to be tilted on the axis of the shaft 37. The conveyor may be adjusted in elevation by removing the bolts 35 and inserting them in any selected aperture 34 in the angle irons 31, after making the desired adjustment.

The driving mechanism for the conveyor belt comprises a pair of pulleys 40, 41 mounted on shafts 42, 43 respectively, which are supported in bearings fixed to the plates 44 attached to the angles 20 of the main conveyor frame. An idler pulley 45 guides the belt into the lower part of the forward portion of the conveyor frame.

Both pulleys 40, 41 are driven from the motor 19. A sprocket chain 47 is driven by sprocket 48 on the shaft of the armature of the electric motor 19. A sprocket chain 50 is driven by a sprocket 51 fixed to the shaft 46 and this sprocket chain 50 drives the sprocket 52 on the shaft 42.

By referring to Fig. 1 it will be seen that on that side of the conveyor opposite the sprocket chain 50 is located a pair of spur gears 53, 54 which are meshed with each other and respectively connected to the shafts 42 and 43. The pulley 41 is therefore driven in synchronism with the pulley 40 and the pulley 41 acts as a snub pulley to provide a more efficient drive for the conveyor belt 16.

It will be seen by referring to Fig. 2 that reduction gearing is located between the motor 19 and the shaft 46, and that further reduction gearing is located between the shaft 46 and the shaft 42, thereby providing for the use of the relatively high speed motor 19.

The motor 19 and the mechanism operated thereby for driving the belt 16 are located on the forward portion D of the conveyor frame C; therefore when the frame C is released it will tilt on the axis 37 to the position shown in Fig. 2. When the rear portion E of the conveyor is moved downwardly so as to elevate the forward portion D for traveling along a track, or otherwise from place to place, the conveyor frame may be held in such travel position by hooking the chain 55 to the curved slotted clip 56 secured to the rear axle 12 as shown in Fig. 4. The upper end of the chain 55 is secured to one of the cross members 25. When in this position the conveyor B is supported entirely from the truck A which truck has both lateral and longitudinal stability.

A take-up mechanism may be provided as shown at 57 in Fig. 2 in accordance with standard practice to provide means for tensioning the conveyor belt or removing the slack therefrom when desirable.

A hopper 58 at the receiving end of the conveyor permits loading from a car hopper or otherwise, without the tendency for any great amount of material moving to the sides of the belt and finding egress through the lateral slots at 29, 29; that is to say, the hopper 58 is so shaped as to permit efficient loading of the belt conveyor by directing the material onto almost the entire width thereof, but sufficiently limiting the loading of the belt near the edges to minimize the spilling of the material over the edges of the belt.

By elevating the rear or discharge end of the conveyor, with the front end on the ground, the bolts 35, 35 may be readily removed and the elevation of said rear end adjusted as previously described.

Also by removing retaining means 35' (Fig. 2) and disconnecting the chain 55, the conveyor unit becomes detachable from the truck unit, which is an advantage for shipping.

The blocks 36, 36 are journaled on the shaft 37 and thus permit free tilting of the conveyor unit about the axis of said shaft. Free sliding movement between the outer surfaces of said blocks 36, 36 and the guideways formed by angle members 31, 31 provides for ready vertical adjustment of said conveyor unit with respect to said truck unit. The bolts 35, 35 of course retain the angle members 31, 31 in any selected position of adjustment with respect to said blocks 36, 36 as previously described.

This application is a division of my application, for a Portable loading machine, Serial No. 563,113 filed September 16, 1931.

Obviously those skilled in the art may make various changes in the details and arrangement of parts without departing from the spirit and scope of the invention as defined by the claim hereto appended and I wish therefore not to be restricted to the precise construction herein disclosed.

Having thus shown and described an embodiment of my invention what I desire to secure by Letters Patent of the United States is:

A portable loader comprising a stable truck having upstanding triangular flat side plates rigidly connected at their bottoms to forward and rearward transverse axles, a shaft at the top of said plates rigidly attached thereto and extending laterally therebeyond, an intermediate brace rigidly attached to said side plates, slide blocks journaled to the lateral extensions of said shaft, a conveyor having downwardly extending guiding and supporting members forming guideways cooperating with said slide blocks, and means cooperating with said slide blocks and guiding and supporting members to hold said conveyor in adjusted relation with respect to said truck.

NILS D. LEVIN.